United States Patent
Shikayama et al.

(10) Patent No.: US 7,576,452 B2
(45) Date of Patent: Aug. 18, 2009

(54) CORELESS LINEAR MOTOR AND CANNED LINEAR MOTOR

(75) Inventors: Toru Shikayama, Fukuoka (JP); Kenichi Sadakane, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 266 days.

(21) Appl. No.: 10/586,239

(22) PCT Filed: Jan. 11, 2005

(86) PCT No.: PCT/JP2005/000177

§ 371 (c)(1), (2), (4) Date: Jul. 17, 2006

(87) PCT Pub. No.: WO2005/069467

PCT Pub. Date: Jul. 28, 2005

(65) Prior Publication Data

US 2007/0152513 A1 Jul. 5, 2007

(30) Foreign Application Priority Data

Jan. 20, 2004 (JP) .............................. 2004-011942

(51) Int. Cl.
*H02K 41/00* (2006.01)
(52) U.S. Cl. ..................................................... 310/12
(58) Field of Classification Search .................... 310/12
See application file for complete search history.

(56) References Cited

U.S. PATENT DOCUMENTS

| | | | | |
|---|---|---|---|---|
| 5,087,844 A | * | 2/1992 | Takedomi et al. | 310/12 |
| 6,140,734 A | * | 10/2000 | Hazelton et al. | 310/198 |
| 6,731,029 B2 | * | 5/2004 | Shikayama et al. | 310/58 |

FOREIGN PATENT DOCUMENTS

| | | |
|---|---|---|
| JP | 11-127569 A | 5/1999 |
| JP | 2001-197718 A | 7/2001 |
| JP | 2002-27730 A | 1/2002 |

* cited by examiner

*Primary Examiner*—Hanh N Nguyen
(74) *Attorney, Agent, or Firm*—Sughrue Mion, PLLC (57) ABSTRACT

A coreless linear motor and a canned linear motor that can significantly reduce an increase in surface temperature of a linear motor armature are provided.

In a magnetic field system of a coreless linear motor $1a$, two rows of permanent magnets $201a$ are disposed on the opposite sides in a magnetic field yoke 202, and an armature $101a$ is disposed so that armature coils $102a$ and $103a$ including a plurality of coil groups centrally wound in the magnetic field system having the two rows of permanent magnets are arranged in two rows. One end of the two rows of the armature coils $102a$ and $103a$ in a direction perpendicular to a direction of a magnetic gap between the two rows of permanent magnets branches into two parts, and the other end is arranged back-to-back. Further, the substrate $104a$ for connecting the coils is inserted into a gap between the two rows of the branching coils $102a$ and $103a$. The armature coils $102a$ and $103a$ and the substrate $104a$ are integrally formed and fixed by mold resin 105.

4 Claims, 6 Drawing Sheets

PRIOR ART

FIG. 5

PRIOR ART

FIG. 6

CORELESS LINEAR MOTOR AND CANNED LINEAR MOTOR

TECHNICAL FIELD

The present invention relates to a coreless linear motor and a canned linear motor that are used for feeding a table of a semiconductor manufacturing apparatus or machine tool and that control an increase in temperature of a linear motor main body.

RELATED ART

Figure 5:
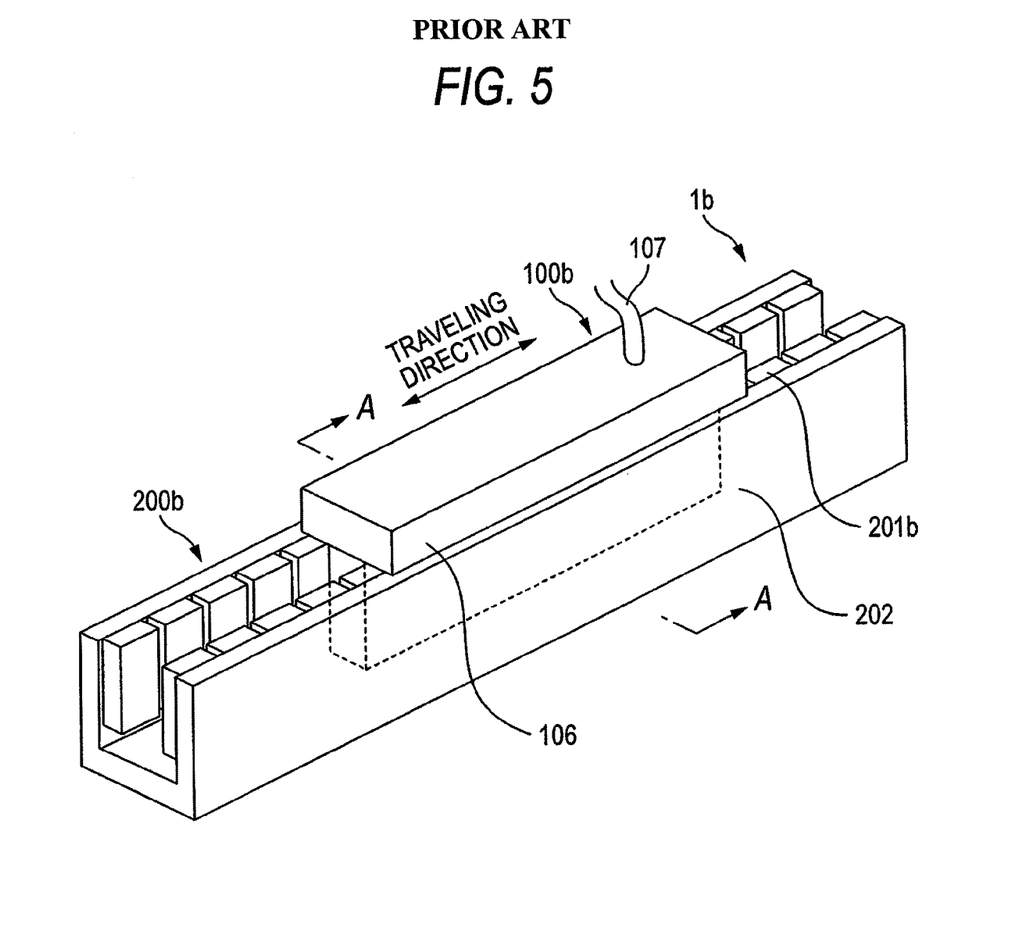
FIG. 5 is a perspective view illustrating a coreless linear motor according to a third embodiment of the invention.
Figure 6:
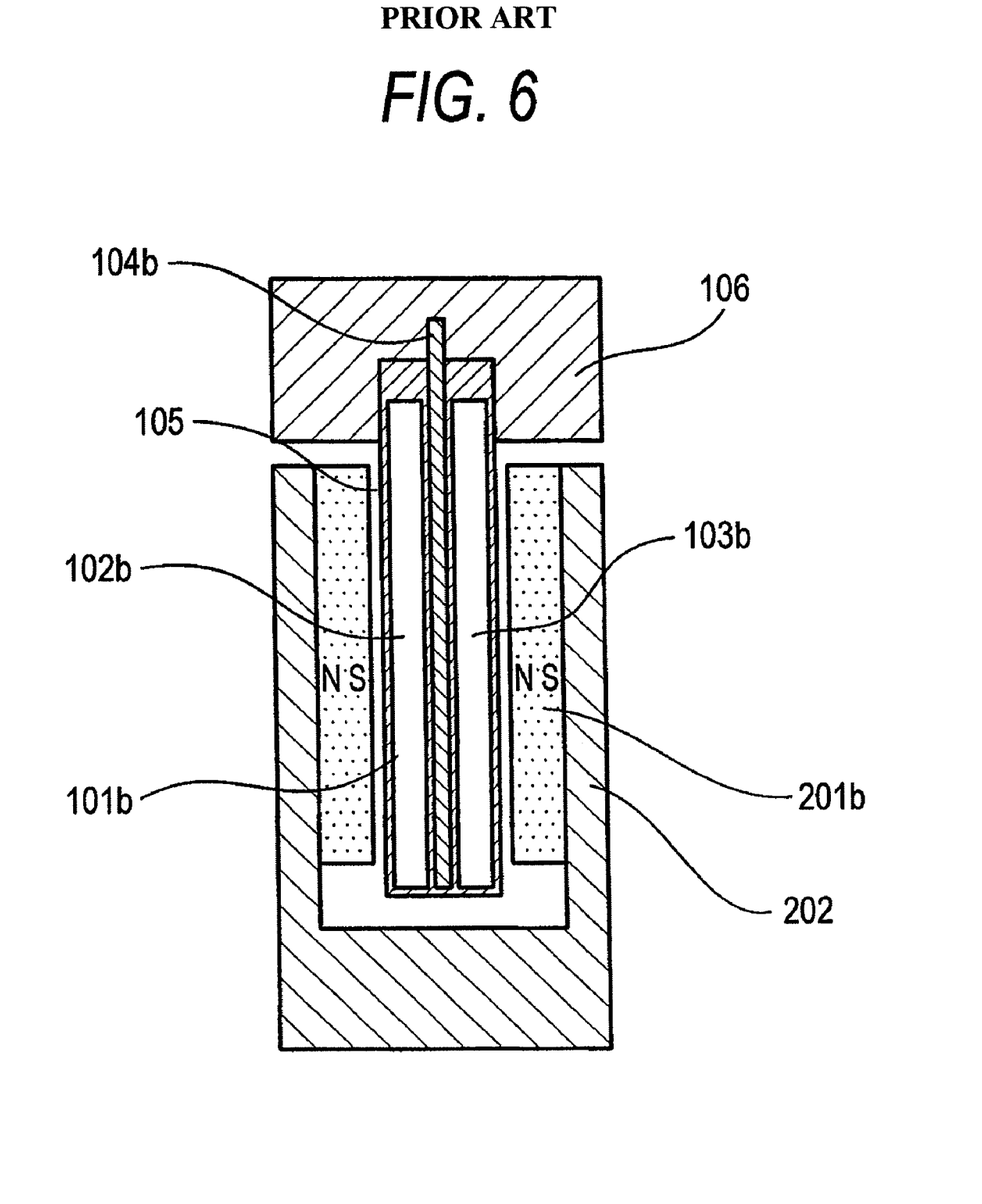
FIG. 6 is a cross-sectional view illustrating the coreless linear motor, taken along line the A-A of FIG. 5.

A known coreless linear motor which is used for feeding a table of a semiconductor manufacturing apparatus or machine tool is shown in FIGS. 5 and 6 (for example, refer to Patent Documents 1 and 2).

FIG. 5 is a perspective view illustrating the entire coreless linear motor in the related art, and FIG. 6 is a front cross-sectional view taken along A-A line of FIG. 5. The following descriptions will be focused on the coreless linear motor disclosed in Patent Document 1.

In FIG. 5, reference numeral 1b represents a coreless linear motor, reference numeral 100b represents a movable member, reference numeral 101b represents an armature, reference numerals 102b and 103b represent armature coils, reference numeral 104b represents a substrate, reference numeral 105 represents mold resin, reference numeral 106 represents an armature fixing plate, reference numeral 107 represents a cable, reference numeral 200b represents a stator, reference numeral 201b represents a permanent magnet, and reference numeral 202 represents a magnetic field yoke.

The stator 200b includes the substantially U-shaped magnetic field yoke 202 and the plurality of permanent magnets 201b having different polarities alternately disposed in a line at predetermined pitches in the magnetic field yoke 202. The stator 200b includes the magnetic field in which two rows of permanent magnets are opposite to each other. Further, the permanent magnets 201b are disposed so that the polarities of the left and right permanent magnets 201b facing each other differ from each other.

The movable member 100b includes the armature 101b, the armature fixing plate 106 for fixing the armature 101b, and the cable 107. The armature 101b is disposed in parallel inside the tow magnet rows of the permanent magnets 201b with a magnetic gap interposed therebetween. Further, the armature 101b has the substrate 104b disposed in the center, the armature coils 102b and 103b are disposed on the left and right sides of the substrate 104b interposed therebetween, and the substrate 104b and the armature coils 102b and 103b are integrally formed by the mold resin 105. The armature 101b is also fixed to the armature fixing plate 106 by the mold resin 105. The armature coils 102b and 103b include a plurality of coil groups which are centrally wound. The substrate 104 is formed by applying a copper-foil pattern onto an epoxy resin (GFRP) plate filled with glass fiber and used for connecting the plurality of coil groups of armature coils 102b and 103b. Moreover, the movable member 100b is supported by a linear guide (not shown) and the like.

When a predetermined current flows into the armature coils 102b and 103b through the cable 107 in the above-mentioned linear motor, thrust acts the movable member 100b due to the interaction of the current and the magnetic field generated by the permanent magnets 201b, so that the movable member 100b moves in a traveling direction shown by an arrow.

[Patent Document 1] JP-A-2001-197718
[Patent Document 2] JP-A-2002-27730

DISCLOSURE OF THE INVENTION

Problem that the Invention is to solve

However, in the related art, because the entire surface of the substrate 104b is disposed between the left and right armature coils 102b and 103b, the following problems occur.

(1) Because the entire GFRP substrate is inserted into the magnetic gap between the two rows of the left and right armature coils, the amount of a magnetic gap increases, and a thrust is reduced due to a reduction in the gap magnetic flux density. As a result, in order to obtain a predetermined thrust, an electric current flowing through the armature coils and an energy loss increase, thereby raising the surface temperature of the linear motor armature.

(2) Because the heat conductivity of the GFRP substrate is poor, the heat resistance of the armature increases, so that the temperature of the armature coils increases due to the energy loss. As a result, the surface temperature of the linear motor armature also significantly increases.

The above-mentioned problems also appear in the canned linear motor disclosed in Patent Document 2, which has armatures having the same configuration as the above.

An object of the invention is to provide a coreless linear motor capable of significantly reducing an increase in surface temperature of the linear motor armature.

Means for Solving the Problems

The invention has the following configurations to overcome the above problems.

According to a first aspect of the invention, there is provided with a coreless linear motor including: a magnetic field system that includes a plurality of permanent magnets arranged in line, polarities of the adjacent permanent magnets being different from each other; and armatures that are disposed to face the rows of the permanent magnets through a magnetic gap and have coreless-type armature coils formed of a plurality of coil groups arranged, wherein when one of the magnetic field system and the armatures serves as a stator and the other serves as a movable member, the magnetic field system and the armatures relatively move, the magnetic field system is constructed so that two magnet rows of permanent magnets face each other, the armatures are disposed so that two rows of armature coils are arranged between the two rows of magnets in the magnetic field system, at least one end of the two rows of armature coils in the direction perpendicular to the direction of a magnetic gap between the rows of magnet branches into two parts and a substrate for connecting the coils is inserted into the gap between the branching parts, the armature coils and the substrate are fixed by mold resin, and the permanent magnet takes the profile of the armature.

According to a second aspect of the invention, there is provided with the coreless linear motor according to the first aspect, wherein the substrate is an aluminum substrate formed by applying an insulating film and a copper-foil pattern on an aluminum plate.

According to a third aspect of the invention, there is provided with a canned linear motor including: a magnetic field system that includes a plurality of permanent magnets arranged in line, polarities of the adjacent permanent magnets being different from each other; armatures that are disposed to face the rows of the permanent magnets through a magnetic gap and have coreless-type armature coils formed of a plurality of coil groups arranged; a can that seals the armature coils; and a refrigerant path that flows a refrigerant between the armature coils and the can, wherein the magnetic field system is constructed so that two magnet rows of permanent magnets face each other, the armatures are disposed so that two rows of armature coils are arranged between the two rows of magnets in composing the magnetic field, at least one end of the two rows of armature coils in the direction perpendicular to the direction of a magnetic gap between the rows of magnets branches into two parts and a substrate for connecting the coils is inserted into the gap between the branching parts, the armature coils and the substrate are fixed by mold resin, and the permanent magnet takes the profile of the armature.

According to a fourth aspect of the invention, there is provided with the canned linear motor according to the third aspect, wherein the substrate is an aluminum substrate formed by applying an insulating film and a copper-foil pattern on an aluminum plate.

Advantage of the Invention

In accordance with the first aspect of the invention, one end of two rows of armature coils in the direction perpendicular to the direction of the magnetic gap between two rows of permanent magnets branches into two parts, the substrate for connecting coils is inserted in the gap between the branching parts, and the permanent magnet takes the profile of the armature. Therefore, as the inserted portion of the substrate in most part of the gap formed between two rows of armature coils is removed, gap magnetic flux density is enhanced and the ratio of thrust to electric current increases. Accordingly, because energy loss can be reduced, it is possible to reduce an increase in temperature on the surface of the linear motor.

In accordance with the second aspect of the invention, the substrate is an aluminum substrate with excellent heat conductivity. Therefore, the heat due to the energy loss of the armature coil rows can be effectively dissipated into the armature fixing plate through the aluminum substrate, thereby further reducing an increase in temperature than in the configuration according to the first aspect.

In accordance with the third aspect of the invention, one end of two rows of armature coils in the direction perpendicular to the direction of the magnetic gap between two rows of permanent magnets branches into two parts, the substrate for connecting coils is inserted in the gap between the branching parts, and the permanent magnet takes the profile of the armature. Therefore, as the inserted portion of the substrate in most part of the gap formed between two rows of armature coils is removed, gap magnetic flux density is enhanced, thus an increase in temperature of the surface of the linear motor armature reduces. Further, because the refrigerant path provide in the armature, it is possible to reduce an increase in temperature than in the configuration of the linear motor according to the first aspect.

In accordance with the fourth aspect of the invention, the substrate is an aluminum substrate with excellent heat conductivity. Therefore, the heat due to the energy loss of the armature coil rows can be effectively dissipated into the armature fixing plate through the aluminum substrate, thus further reducing an increase in temperature than in the configuration according to the third aspect.

DESCRIPTION OF REFERENCE NUMERALS AND SIGNS

1$a$, 1$b$: coreless linear motor
2: canned linear motor
100$a$, 100$b$: stator
101$a$, 10$b$: armature
102$a$, 102$b$: armature coil
103$a$, 103$b$: armature coil
104$a$, 104$b$: substrate
105: mold resin
106: armature fixing plate
107: cable
200$a$, 200$b$: movable member
201$a$, 201$b$: permanent magnet
202: magnetic field yoke
300: movable member
301: permanent magnet
302: magnetic field yoke
303: magnetic field yoke supporting member
400: stator
401: armature
402: can
403: fixing bolt
404: pressing plate
405: terminal block
406: refrigerant supply port
407: refrigerant discharge port
408, 409: armature coil
410: substrate
411: mold resin
412: refrigerant path
413: O-ring
414: casing

BEST MODE FOR CARRYING OUT THE INVENTION

Hereinafter, preferred embodiments of the invention will be described with reference to the accompanying drawings.

FIRST EMBODIMENT

Figure 1:
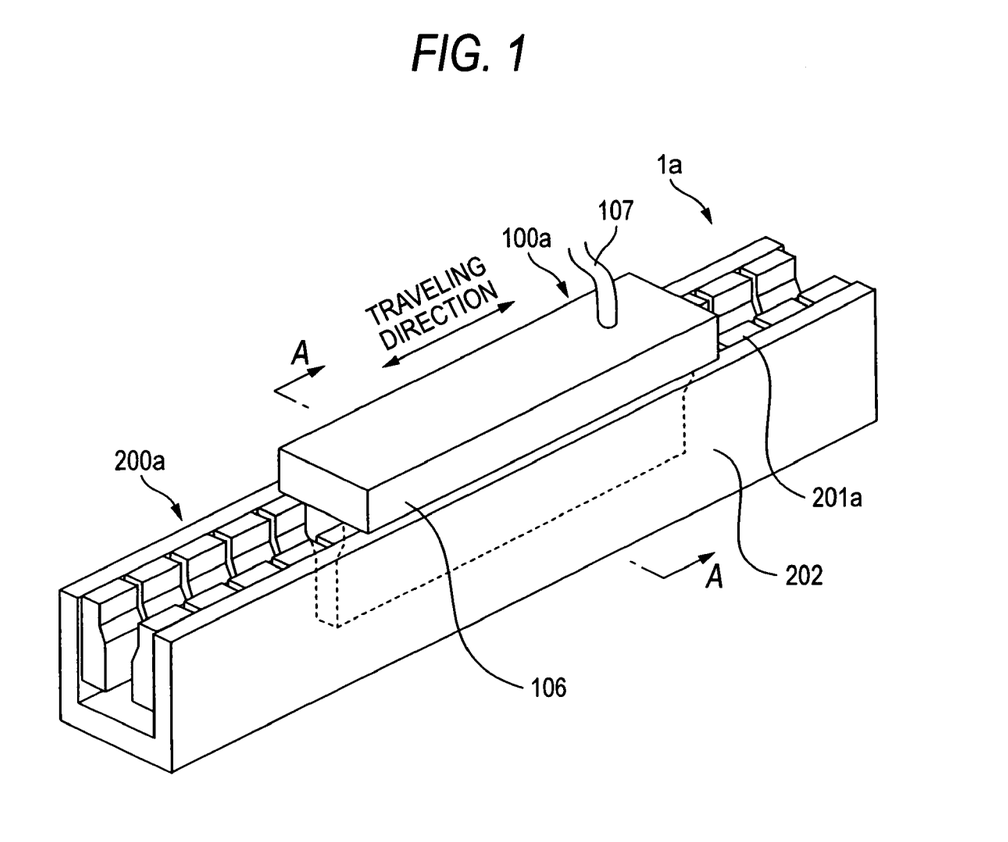
FIG. 1 is a perspective view illustrating a coreless linear motor according to a first embodiment of the invention.
Figure 2:
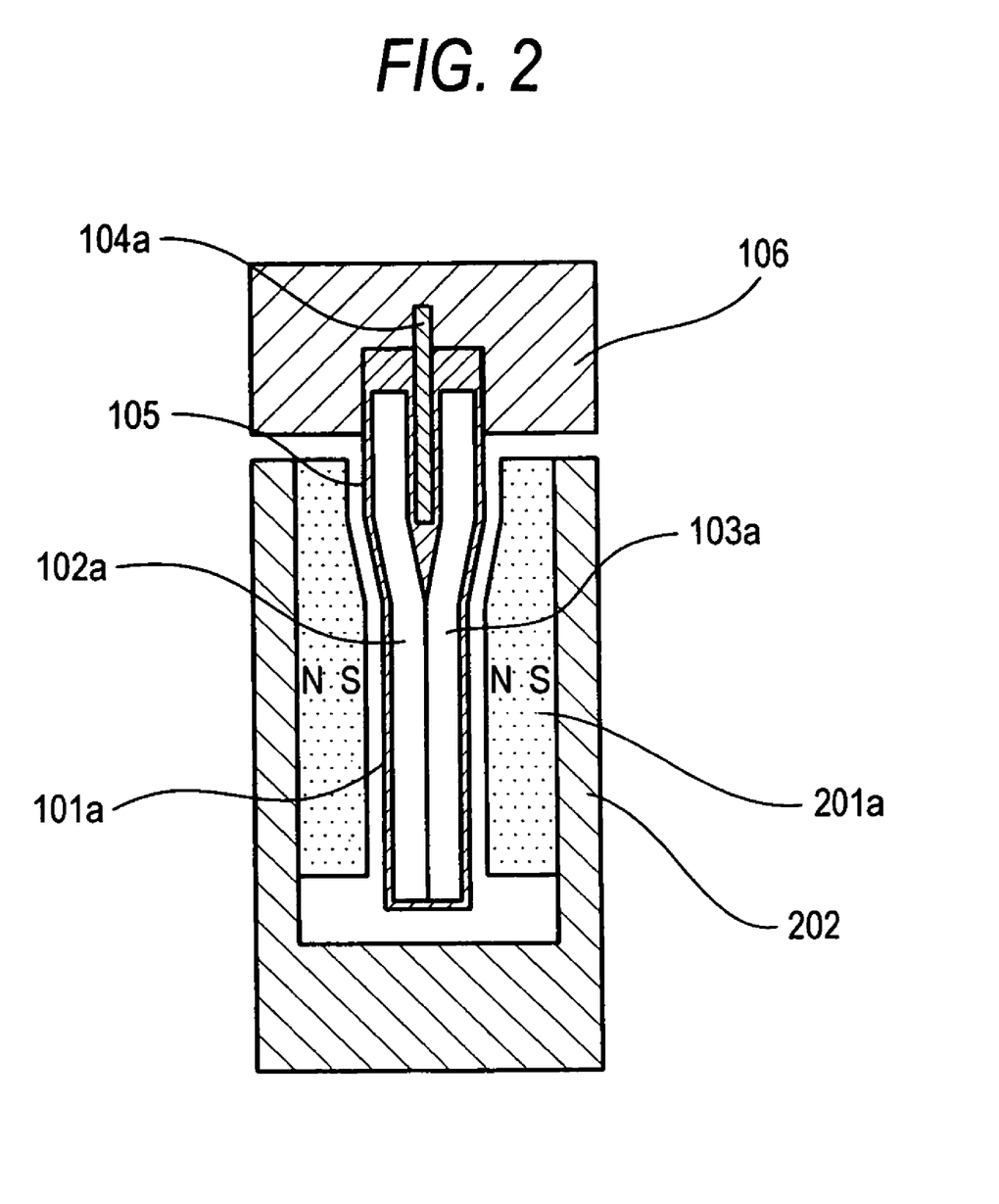
FIG. 2 is a cross-sectional view illustrating the coreless linear motor, taken along the line A-A of FIG. 1.

FIG. 1 is a perspective view illustrating a coreless linear motor according to a first embodiment of the invention, and FIG. 2 is a cross-sectional view illustrating the coreless linear motor, taken along line A-A of FIG. 1. Hereinafter, like reference numerals are given to the like components as those in the related art and they are not described in detail except for the different components.

In the drawings, reference numeral 1$a$ represents a coreless linear motor, reference numeral 100$a$ represents a movable member, reference numeral 101$a$ represents an armature, reference numerals 102$a$ and 103$a$ represent armature coils, reference numeral 104$a$ represents a substrate, reference numeral 200$a$ represents a stator, and reference numeral 201$a$ represents a permanent magnet. The drawings illustrate a relative motion of the armature 101 and the magnetic field system in the coreless linear motor 1a, where the armature 101 is the movable member 100a and the magnetic field system is the stator 200a.

The invention has features as follows.

In the magnetic field system of the coreless linear motor 1a, two rows of permanent magnets 201a are disposed on the opposite sides in a magnetic field yoke 202 and the armature 101a is disposed between the two rows of permanent magnets in the magnetic field system so that the armature coils 102a and 103a including a plurality of coil groups centrally wound are arranged in two rows. One end of two rows of armature coils 102a and 103a in the direction perpendicular to the direction of a magnetic gap between two rows of permanent magnets branches into two parts, and the other end is arranged back-to-back. Further, the substrate 104a for connecting the coils is inserted into the gap between branching parts 102a and 103a. The armature coils 102a and 103a and the substrate 104a are integrally formed and fixed by mold resin 105. The permanent magnet 201a takes the profile of the armature 101a. Further, the thickness of the permanent magnet 201a is smaller at the opening of the magnetic field yoke 202 than at the bottom.

The substrate 104a formed by applying a copper-foil pattern is provided on a GFRP plate is smaller than the substrate 104b in the related art.

Similar to those in the coreless linear motor 1a configured as described above, when a predetermined electric current flows into the armature coils 102a and 103a through a cable 107, thrust acts on the movable member 100a due to the interaction of the current and the magnetic field generated by the permanent magnet 201a, and the movable member 10a moves in a traveling direction shown by an arrow, similar to the related art.

According to the above-mentioned configuration, it is possible to remove most part of the GFRP substrate which is disposed in the large magnetic gap length between two rows of armature coils. According to the first embodiment, at least one end of the two rows of armature coils in the direction perpendicular to the direction of the magnetic gap between two magnet rows branches into two parts, the substrate for connecting coils is inserted into the gap between the branching parts, and the permanent magnet takes the profile of the armature. Therefore, as the inserted portion of the substrate in most part of the magnetic gap formed between two rows of armature coils is removed, gap magnetic flux density is enhanced and increases a thrust to electric-current ratio. Accordingly, since the Joule loss can be reduced, it is possible to reduce an increase in surface temperature of the linear motor.

SECOND EMBODIMENT

Figure 3:
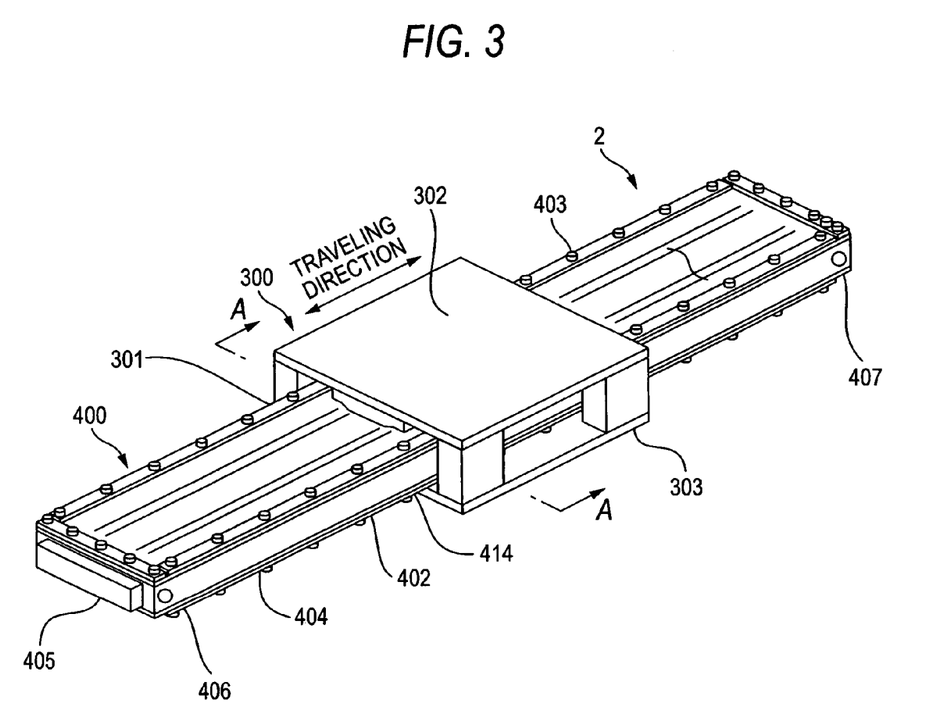
FIG. 3 is a perspective view illustrating a canned linear motor according to a second embodiment of the invention.
Figure 4:
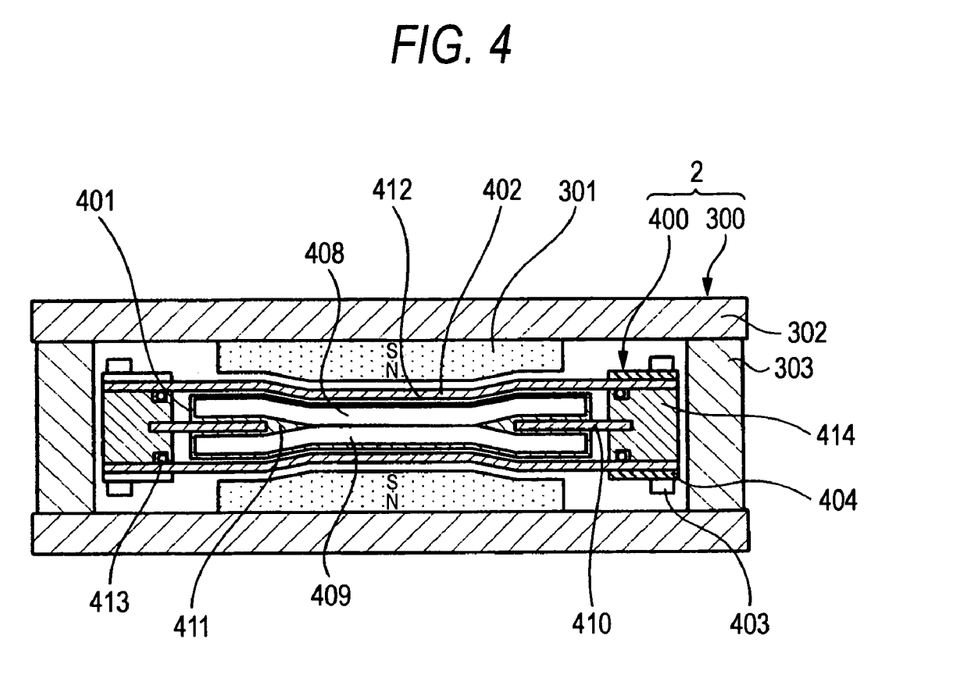
FIG. 4 is a cross-sectional view illustrating the canned linear motor, taken along the line A-A of FIG. 3.

FIG. 3 is a perspective view illustrating a canned linear motor according to a second embodiment of the invention, and FIG. 4 is a cross-sectional view illustrating the canned linear motor, taken along A-A line of FIG. 3.

In the figures, reference numeral 2 represents the canned linear motor, reference numeral 300 represents a movable member, reference numeral 301 represents a permanent magnet, reference numeral 302 represents a magnetic field yoke, reference numeral 303 represents a magnetic field yoke supporting member, reference numeral 400 represents a stator, reference numeral 401 represents an armature, reference numeral 402 represents a can, reference numeral 403 represents a fixing bolt, reference numeral 404 represents a pressing plate, reference numeral 405 represents a terminal block, reference numeral 406 represents a refrigerant supply port, reference numeral 407 represents a refrigerant discharge port, reference numerals 408 and 409 represent armature coils, reference numeral 410 represents a substrate, reference numeral 411 represents mold resin, reference numeral 412 represents a refrigerant path, reference numeral 413 represents an O-ring, and reference numeral 414 represents a casing. The figures show the relative motion of a magnetic field system and armatures in the canned linear motor 2, where the magnetic field system is set to the movable member 300 and the armature 401 is set to the stator 400.

The invention has features as follows.

In the magnetic field of the canned linear motor 2, two rows of magnets formed of a plurality of permanent magnets 301 are arranged to face each other. The plurality of permanent magnets 301 having different polarities are alternately disposed on the inner surfaces of the magnetic field yokes 302 disposed on the upper and lower sides. Further, the magnetic field yoke supporting members 303 are disposed at four corners between two magnetic filed yoke 302 facing each other. Armatures 401 are disposed in parallel in the magnetic gap between two magnet rows of permanent magnets 301 to face each other. Coreless-type armature coils 408 and 409 including a plurality of coil groups centrally wound are disposed in two rows. Two rows of armature coils 408 and 409 are disposed between the two rows of magnets, their central portions in the direction perpendicular to the magnetic gap direction are arranged back-to-back, and both ends branch into two parts, respectively. A substrate 410 for connecting coils is inserted into the gap between the branching coil rows 408 and 409, and the armature coils 408 and 409 and the substrate 401 are integrally formed and fixed by a mold resin 411. Further, the permanent magnet 301 takes the profile of the armature 401. The thickness of the permanent magnet 301 is smaller on the side close to the magnetic field yoke supporting member 303 than at the central portion.

The stator 400, that is, the armature 401 includes the armature having a hollow rectangular (frame-shaped) metallic casing 414, a plate-shaped can 402 sealing the armature coils 408 and 409 and having an outer shape for covering the hollow of the casing 414, and a refrigerant path for flowing refrigerant between the armature coil and the can. The stator 400 includes fixing bolts 403 for fixing the can 402 to the casing 414, a pressing plate 404 having a through holes for the fixing bolt 403 and presses the can with a uniform load, the armature 401 disposed in the cavity of the casing 414, an O-ring 413 substantially larger than the edges of the casing 414 and the can 402, a terminal block 405 attached on the casing 414, and refrigerant supply and discharge ports 406 and 407 provided in the front and back of the casing 414, respectively. The can 402 is formed of resin. For example, epoxy resin which is thermosetting resin or polyphenylene sulfide (PPS) which is thermoplastic resin is used. The shape of the cavity of the casing 414 is formed so as to surround the outer circumference of the armature 401.

The substrate 410 is a GFRP substrate on which a copper-foil pattern is applied, and is used for connecting the plurality of armature coils 408 and 409. The armature coils 408 and 409 is powered through the terminal blocks 405 electrically connected to the substrate 410 and a lead wire (not shown), respectively, and attached to the casing 414. Further, a refrigerant is supplied from the refrigerant supply port 406 and is discharged out of the refrigerant discharge port 407. While the refrigerant flows in the refrigerant path 412 between the armature 401 and the can 402, the refrigerant cools down the armature 401 which emits heat.

In the canned linear motor 2 configured as described above, a predetermined current according to an electrically relative position of the movable member 300 and the stator 400 is caused to flow in the armature coils 408 and 409, so that thrust acts on the movable member 300 due to the interaction of the current and the magnetic field generated by the permanent magnet 301. In this configuration, the armature coils 408 and 409 which emit heat due to the energy loss are cooled down by the refrigerant flowing in the refrigerant path 412. Therefore, it is possible to prevent the surface temperature of the can 402 from rising.

Although most part of the GFRP substrate is disposed in the large magnetic gap between two rows of armature coils in the related art, the above-mentioned configuration allows the most part of the GFRP substrate to be removed, similar to the first embodiment. Therefore, it is possible to reduce the magnetic gap. As the magnetic gap is reduced and the gap magnetic flux density is enhanced, it is possible to decrease the ratio of thrust to electric current. Accordingly, because the energy loss can be reduced, it is possible to reduce an increase in surface temperature of the can.

THIRD EMBODIMENT

The substrates 104a and 410 of the first and second embodiments are formed of the GFRP substrate, but a substrate, in a third embodiment, is formed of an aluminum substrate formed by applying an insulating film and a copper-foil pattern on an aluminum plate.

According to the above configuration, the heat generated in the armature coils due to the energy loss can be dissipated into the armature fixing plate 106 in the coreless linear motor of the first embodiment. Further, the heat can be effectively dissipated through the aluminum substrate having excellent heat conductivity to the casing 414 in the canned linear motor of the second embodiment. Accordingly, it is possible to further reduce an increase in temperature.

INDUSTRIAL APPLICABILITY

According to the coreless linear motor and the canned linear motor of the present invention, thrust increases due to the improvement of the gap magnetic flux density and heat resistance is reduced by the aluminum substrate. Therefore, the invention can be applied to a positioning mechanism of a semiconductor manufacturing apparatus, which can avoid thermal expansion caused by an increase in temperature while performing acceleration and deceleration driving with extreme precision.

The invention claimed is:

1. A coreless linear motor comprising:
a magnetic field system that includes a plurality of permanent magnets arranged in line, polarities of the adjacent permanent magnets being different from each other; and
armatures that are disposed to face the rows of the permanent magnets through a magnetic gap and have coreless-type armature coils formed of a plurality of coil groups arranged, wherein
when one of the magnetic field system and the armatures serves as a stator and the other serves as a movable member, the magnetic field system and the armatures relatively move,
the magnetic field system is constructed so that two magnet rows of permanent magnets face each other,
the armatures are disposed so that two rows of armature coils are arranged between the two rows of magnets in the magnetic field system,
at least one end of the two rows of armature coils in the direction perpendicular to the direction of a magnetic gap between the rows of magnet branches into two parts and a substrate for connecting the coils is inserted into the gap between the branching parts,
the two rows of armature coils being attached to each other without the substrate being present in between the coils at portions other than at said at least one end,
the armature coils and the substrate are fixed by mold resin, and
the permanent magnet takes the profile of the armature.

2. The coreless linear motor according to claim 1, wherein the substrate is an aluminum substrate formed by applying an insulating film and a copper-foil pattern on an aluminum plate.

3. A canned linear motor comprising:
a magnetic field system that includes a plurality of permanent magnets arranged in line, polarities of the adjacent permanent magnets being different from each other;
armatures that are disposed to face the rows of the permanent magnets through a magnetic gap and have coreless-type armature coils formed of a plurality of coil groups arranged;
a can that seals the armature coils; and
a refrigerant path that flows a refrigerant between the armature coils and the can, wherein
the magnetic field system is constructed so that two magnet rows of permanent magnets face each other,
the armatures are disposed so that two rows of armature coils are arranged between the two rows of magnets in composing the magnetic field,
at least one end of the two rows of armature coils in the direction perpendicular to the direction of a magnetic gap between the rows of magnets branches into two parts and a substrate for connecting the coils is inserted into the gap between the branching parts,
the two rows of armature coils being attached to each other without the substrate being present in between the coils at portions other than at said at least one end,
the armature coils and the substrate are fixed by mold resin, and
the permanent magnet takes the profile of the armature.

4. The canned linear motor according to claim 3, wherein the substrate is an aluminum substrate formed by applying an insulating film and a copper-foil pattern on an aluminum plate.

* * * * *